United States Patent Office 3,532,729
Patented Oct. 6, 1970

3,532,729
PREPARATION OF SILOXANES IN EMULSION
Joseph Cekada, Jr., and Donald R. Weyenberg, Midland, Mich., assignors to Dow Corning Corporation, Midland, Mich., a corporation of Michigan
No Drawing. Filed Sept. 25, 1967, Ser. No. 670,396
Int. Cl. C07f 7/08; C08f 21/00, 35/02
U.S. Cl. 260—448.2
12 Claims

ABSTRACT OF THE DISCLOSURE

Siloxanes are prepared by the reaction of a mercapto-organosiloxane, in emulsion, with a polymerizable or non-polymerizable olefin.

---

This invention relates to methods of preparing siloxanes in emulsion.

More specifically, this invention relates to a method for preparing a siloxane containing at least one percent by weight of units of the general formula

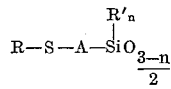

wherein A is an alkylene or arylene radical, R is a hydrocarbon radical derived from a non-polymerizable olefin, R' is a methyl or phenyl radical and $n$ has a value from 0 to 2, said method comprising first preparing an emulsion of a siloxane containing at least one percent by weight of units of the general formula

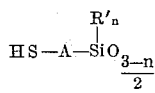

wherein A, R' and $n$ are as defined above, then adding a non-polymerizable olefin to the emulsion, and thereafter causing the addition of the olefin to the siloxane by free radical catalysis.

This invention also relates to a method for preparing a siloxane containing at least one percent by weight of units of the general formula

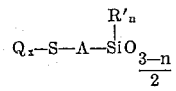

wherein A is an alkylene or arylene radical, Q a mer derived from a polymerizable olefin, $x$ is an integer greater than 1, R' is a methyl or phenyl radical and $n$ has a value from 0 to 2, said method comprising first preparing an emulsion of a siloxane containing at least one percent by weight of units of the general formula

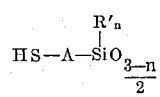

wherein A, R' and $n$ are as defined above, then adding a polymerizable olefin to the emulsion, and thereafter causing the polymerization of the olefin and its addition to the siloxane by free radical catalysis.

As stated above, one process of this invention is for the preparation of siloxanes containing at least one percent by weight of units of the general unit formula

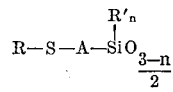

while the other process is for the preparation of siloxanes containing at least one percent by weight of units of the general unit formula

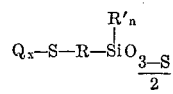

In the above formulae A can be any alkylene or arylene radical. Thus, A can be, for example, a —$CH_2$—, —$CH_2CH_2$—, —$(CH_2)_3$—, —$(CH_2)_4$—, —$(CH_2)_6$—, —$(CH_2)_{12}$—, —$CH_2CH(CH_3)CH_2$—
  —$CH_2CH(C_2H_5)CH_2CH_2CH_2CH_2$—
          —$(CH_2)_{20}$—

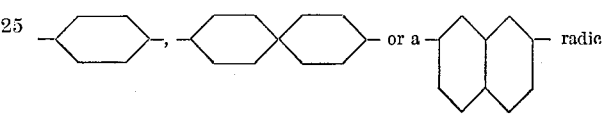

Preferably A contains from 1 to 12 carbon atoms with the radicals containing from 2 to 6 carbon atoms being the most preformed.

The R radical in the above formula can by any hydrocarbon radical derived from a non-polymerizable olefin. The term "non-polymerizable" olefin is used herein in the conventional sense to denote hydrocarbons containing aliphatic, carbon to carbon, non-cojugated unsaturation which do not form polymers in the presence of free radical catalysts under normal polymerization conditions as well as other compounds which behave in the same manner. Specific examples of R radicals and the non-polymerizable olefins from which they are derived are set forth below.

Non-polymerizable Olefin | R radical
--- | ---
$CH_2=CH_2$ | $CH_3CH_2$—
$CH_3CH=CH_2$ | $CH_3CH_2CH_2$—
$CH_3CH_2CH=CHCH_3$ | $CH_3CH_2CH_2CH(CH_3)$—

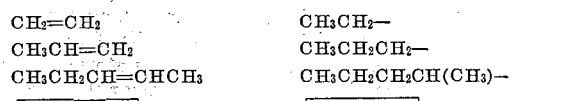

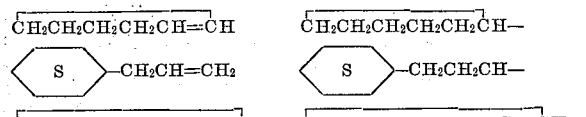

The symbol Q in the above formula can be any mer derived from a polymerizable olefin. The term "polymerizable" olefin is used herein in the conventional sense to denote compounds containing aliphatic, carbon to carbon, conjugated unsaturation which form polymers in the presence of free radical catalysts under normal polymerization conditions as well as other compounds which behave in the same manner. Specific examples of mers represented by Q and the polymerizable olefins from which they are derived are set forth below.

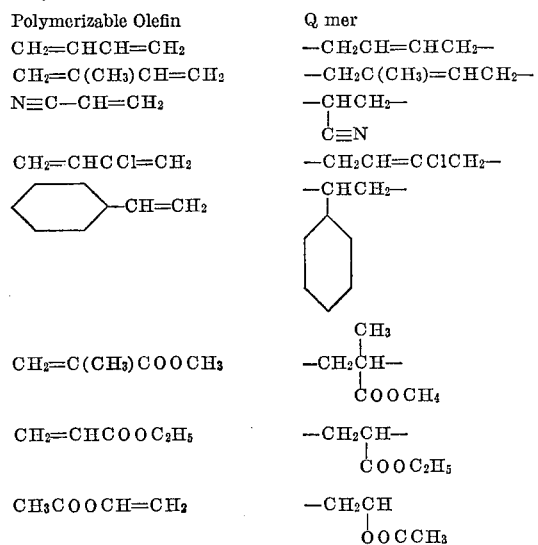

The subscript $x$ is any integer greater than 1 and simply denotes the number of units in the polymer portion, i.e., it sets forth the degree of plymerization.

The R' radical can be a methyl or phenyl radical and there can be 0, 1 or 2 of the R' radicals attached to the silicon atom, i.e., $n$ has a value of from 0 to 2. Preferably $n$ is zero.

In carrying out the processes of this invention the first step involves the preparation of an emulsion of a siloxane containing at least one percent by weight of units of the formula

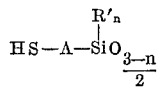

The emulsion can be prepared by the emulsification of the siloxane prepared by bulk or solution techniques, or the emulsion can also be prepared directly by employing emulsion polymerization techniques such as described in U.S. Pats. 2,891,920 and 3,294,725 and French Pat. 1,460,203, the disclosures of which are incorporated herein by reference. The siloxane can be composed solely of

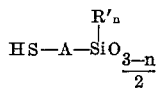

units, or the siloxane can contain up to ninety-nine percent by weight of $R''SiO_{3/2}$, $R''_2SiO$ and/or $R''_3SiO_{1/2}$ units wherein $R''$ is a hydrocarbon or halohydrocarbon radical. The siloxane can also contain small amounts, say up to five percent by weight, or $SiO_{4/2}$ units. Preferably the $R''$ radical contains from 1 to 12 carbon atoms. After the emulsion of the siloxane has been prepared there is added thereto either a polymerizable olefin, which polymerizes and adds to the siloxane by free radical catalysts, or a non-polymerizable olefin, which simply adds to the siloxane by free radical catalysts.

The free radical catalysts that can be employed in the process of this invention include organic peroxides such as di-(t-butyl)peroxide, dicumyl peroxide and t-butyl hydroperoxide; diacyl peroxides such as acetyl peroxide, lauroyl peroxide and benzoyl peroxide; inorganic peroxides such as hydrogen peroxide, ammonium persulfate and potassium persulfate; and azo compounds such as azobis (isobutyronitrile). Free radical catalysts can also be achieved by the use of ultraviolet light or cobalt-60 irradiation. Other free radical catalysts will be obvious to those skilled in the art. The preferred free radical catalysts at this time are the inorganic peroxides.

The temperature at which the processes of this invention are carried out is not critical so far as is known at this time. Of course it is obvious that extremely high temperatures would not be desirable because of detrimental effects on the system and the products. Likewise, extremely low temperatures would not be desirable. Generally speaking, a temperature with the range of 20° to 90° C. will be most desirable. Also as a general rule, the reaction should be carried out under an inert atmosphere and the system should be kept near a neutral pH to avoid undesirable side reactions.

The relative proportions of the siloxane and olefin can vary widely. However, generally speaking, close to stoichoimetric proportions should be employed.

The products produced by the processes of this invention have many and varied utilities that will be obvious to those skilled in the art. For example, the products of the siloxane and acrylate are useful as paint additives to give improved weatherability, and the products of the siloxane and styrene can be used in making molding compositions. The products of these processes also can be used as additives to compositions to impart thermal stability and as textile treating agents.

Now in order that those skilled in the art may better understand how the present invention can be practiced, the following examples are given by way of illustration and not by way of limitation.

All percents referred to herein are on a weight basis unless otherwise specified. In all instances the ammonium persulfate was added as a 1% aqueous solution.

EXAMPLE 1

An emulsion containing about 4.92% of a siloxane composed of about 50% $CH_3SiO_{3/2}$ units and about 50% $HS(CH_2)_3SiO_{3/2}$ units was prepared by emulsion polymerization from the corresponding trimethoxysilanes. A 200 g. portion of this emulsion was placed in each of four flasks. Varying amounts of octene-1 and ammonium persulfate were added to each flask and then the contents heated at 70° C., with agitation, for about 18 hours under a nitrogen atmosphere. Subsequent analyses showed at least 80% of the nonpolymerizable olefin had added to the siloxane so that it now was composed of $CH_3SiO_{3/2}$ units and $C_8H_{17}S(CH_2)_3SiO_{3/2}$ units. The amounts of octene-1 and ammonium persulfate used in each case is set forth in the table below.

| Flask | Octene-1 (g.) | Ammonium persulfate (g.) |
|---|---|---|
| A | 3.88 | 0.0116 |
| B | 1.94 | 0.0058 |
| C | 0.98 | 0.0029 |
| D | 5.83 | 0.0175 |

EXAMPLE 2

An emulsion containing about 4.84% of a siloxane composed of about 95% $CH_3SiO_{3/2}$ units and about 5%

$$HS(CH_2)_3SiO_{3/2}$$

units was prepared by emulsion polymerization from the corresponding trimethoxysilanes. A 400 g. portion of this emulsion was placed in a one liter, three-necked flask equipped with a stirrer, condensed, nitrogen inlet and thermocouple. After purging with nitrogen for 30 minutes, 17.6 g. of styrene and 0.0528 g. of ammonium persulfate were added and the mixture heated at 70° C. for 17 hours. A translucent appearing emulsion of the siloxane resulted which was now composed of $CH_3SiO_{3/2}$ units and

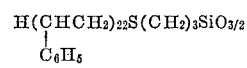

units.

EXAMPLE 3

The procedure of Example 2 was repeated exactly, including proportions, except that methylmethacrylate was substituted for the styrene. The siloxane resulting in the emulsion was composed of $CH_3SiO_{3/2}$ units and $$H[CH_2OOCC(CH_3)CH_2]_{23}\text{—}S(CH_2)_3SiO_{3/2}$$

units.

EXAMPLE 4

An emulsion containing about 4.6% of a siloxane composed of about 95% $CH_3SiO_{3/2}$ units and about 5% $HS(CH_2)_3SiO_{3/2}$ units was prepared as in Example 2. A 1000 g. portion of this emulsion was placed in a flask equipped as in Example 2. After purging with nitrogen, 46.4 g. of ethyl acrylate (washed twice with a 5% NaOH–20% NaCl solution and twice with water to remove the inhibitor present) and 0.139 g. of ammonium persulfate were added and the mixture heated at 70° C. for 24 hours. A hazy-clear emulsion of the siloxane resulted which was now composed of $CH_3SiO_{3/2}$ units and $H(C_2H_5OOCCHCH_2)_{39}S(CH_2)_3SiO_{3/2}$ units.

EXAMPLE 5

To 1013.9 g. of a $CH_3SiO_{3/2}$—$HS(CH_2)_3SiO_{3/2}$ emulsion, as described in Example 4, containing 0.139 g. of ammonium persulfate there was added dropwise over a 30 minute period a mixture of 23.2 g. of methyl methacrylate and 23.2 g. of ethyl acrylate. The addition was made at 70° C. under a nitrogen atmosphere. After stirring for 24 hours at 70° C. a hazy emulsion of the siloxane resulted which was now composed of $CH_3SiO_{3/2}$ units and $$H[CH_3OOCC(CH_3)CH_2]_{20}\text{—}(C_2H_5OOCHCH_2)_{20}S(CH_2)_3SiO_{3/2}$$

units.

EXAMPLE 6

When the siloxanes set forth below are substituted for the siloxanes of the previous examples in equivalent amounts, essentially identical results and corresponding products are obtained.

| | | |
|---|---|---|
| (A) | 100% | $HSCH_2CH_2SiO_{3/2}$ |
| (B) | 100% | $HS(CH_2)_4SiO_{3/2}$ |
| (C) | 25% | $HSCH_2CH(CH_3)CH_2SiO_{3/2}$ |
| | 75% | $C_6H_5SiO_{3/2}$ |
| (D) | 10% | $HS(CH_2)_{12}SiO_{3/2}$ |
| | 90% | $CH_3SiO_{3/2}$ |
| (E) | 15% | $HS(CH_2)_3SiO_{3/2}$ |
| | 10% | $CF_3CH_2CH_2SiO_{3/2}$ |
| | 75% | $CH_3SiO_{3/2}$ |
| (F) | 15% | $HS(CH_2)_3SiO_{3/2}$ |
| | 85% | $(CH_3)_2SiO$ |
| (G) | 5% | $HS(CH_2)_3SiO_{3/2}$ |
| | 2% | $SiO_{4/2}$ |
| | 3% | $(CH_3)_3SiO_{1/2}$ |
| | 90% | $C_2H_5SiO_{3/2}$ |
| (H) | 5% | $HSCH_2CH_2SiO_{3/2}$ |
| | 5% | $Cl(CH_2)_3SiO_{3/2}$ |
| | 90% | $CH_3(C_2H_5)SiO$ |
| (I) | 75% | $HS(CH_2)_6SiO_{3/2}$ |
| | 5% | $Cl_2C_6H_3SiO_{3/2}$ |
| | 20% | $CH_3SiO_{3/2}$ |
| (J) | 100% | HS—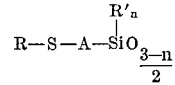—$SiO_{3/2}$ |
| (K) | 5% | HS—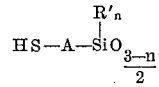—$SiO_{3/2}$ |
| | 95% | $CH_3SiO_{3/2}$ |
| (L) | 5% | $HS(CH_2)_3\underset{\underset{}{|}}{Si}O_{1/2}$ with $(CH_3)_2$ |
| | 95% | $CH_3SiO_{3/2}$ |
| (M) | 5% | $HS(CH_2)_3\underset{\underset{}{|}}{Si}O$ with $C_6H_5$ |
| | 95% | $CH_3SiO_{3/2}$ |

That which is claimed is:

1. A method for preparing a siloxane containing at least one percent by weight of units of the general $$R\text{—}S\text{—}A\text{—}\underset{\underset{}{|}}{\overset{R'_n}{Si}}O_{\frac{3-n}{2}}$$

A is an alkylene or arylene radical,
R is a hydrocarbon radical derived from a non-polymerizable olefin,
R' is a methyl or phenyl radical, and
n has a value from 0 to 2, said method comprising first preparing an emulsion of a siloxane containing at least one percent by weight of units of the general formula $$HS\text{—}A\text{—}\underset{\underset{}{|}}{\overset{R'_n}{Si}}O_{\frac{3-n}{2}}$$

wherein A, R' and n are as defined above, then adding a non-polymerizable olefin to the emulsion, and thereafter causing the addition of the olefin to the siloxane by free radical catalysis.

2. The method of claim 1 wherein any other siloxane units present have the general formula $R''SiO_{3/2}$ wherein R'' is a hydrocarbon or halohydrocarbon radical.

3. The method of claim 2 wherein n is zero, A is a propylene radical, R is an octyl radical derived from octene-1, and R'' is a methyl radical.

4. The method of claim 3 wherein the siloxane is composed of about 50% $C_8H_{17}S(CH_2)_3SiO_{3/2}$ units and about 50% $CH_3SiO_{3/2}$.

5. A method for preparing a siloxane containing at least one percent by weight of units of the general formula $$Q_x\text{—}S\text{—}A\text{—}\underset{\underset{}{|}}{\overset{R'_n}{Si}}O_{\frac{3-n}{2}}$$

wherein

A is an alkylene or arylene radical,
Q is a mer derived from a polymerizable olefin,
x is an integer greater than 1,
R' is a methyl or phenyl radical, and
n has a value from 0 to 2, and at least one unit selected from the group consisting of $R''SiO_{3/2}$, $R''_2SiO$ and $R''_3SiO_{1/2}$ units in the amount of 0 to 99 percent by weight and wherein R'' is a hydrocarbon or halohyldrocarbon radical, and $SiO_{4/2}$ units in the amount of 0 to 5 percent by weight, said method comprising first preparing an emulsion of a siloxane containing at least one percent by weight of units of the general formula $$HS\text{—}A\text{—}\underset{\underset{}{|}}{\overset{R'_n}{Si}}O_{\frac{3-n}{2}}$$

wherein A, R' and n are as defined above, and at least one unit selected from the group consisting of $R''SiO_{3/2}$, $R''_2SiO$ and $R''_3SiO_{1/2}$ units in the amount of 0 to 99 percent by weight and wherein R'' is as defined above, and $SiO_{4/2}$ units in the amount of 0 to 5 percent by weight, then adding a polymerizable olefin to the emulsion, and thereafter causing the polymerization of the olefin and its addition to the siloxane by free radical catalysis.

6. The method of claim 5 wherein any other siloxane units present have the general formula $R''SiO_{3/2}$ wherein R'' is a hydrocarbon or halohydrocarbon radical.

7. The method of claim 6 wherein n is zero, A is a propylene radical and R'' is a methyl radical.

8. The method of claim 7 wherein the siloxane is composed of about 5% $Q_x$—$S(CH_2)_3SiO_{3/2}$ units and about 95% $CH_3SiO_{3/2}$ units.

9. The method of claim 8 wherein Q is $$H[CH(C_6H_5)CH_2]_x-$$

derived from styrene.

10. The method of claim 8 wherein Q is $$H[CH_3OOC(CH_3)CH_2]_x-$$

derived from methyl methacrylate.

11. The method of claim 8 wherein Q is $$H(C_2H_5OOCCHCH_2)_x-$$

derived from ethyl acrylate.

12. The method of claim 8 wherein Q is $$H[CH_3OOC(CH_3)CH_2]_x(C_2H_5OOCHCH_2)_x-$$

derived from a mixture of methyl methacrylate and ethyl acrylate.

References Cited

UNITED STATES PATENTS

| | | | |
|---|---|---|---|
| 2,960,492 | 11/1960 | Morton et al. | 260—448.2 X |
| 2,967,192 | 1/1961 | Kantor | 260 |
| 3,170,940 | 2/1965 | Johnston | 260 |
| 3,186,965 | 6/1965 | Plueddemann | 360—827 X |
| 3,294,725 | 12/1966 | Findlay et al. | 260—448.2 X |
| 3,453,230 | 7/1969 | Plueddemann | 260—827 X |

TOBIAS E. LEVOW, Primary Examiner

P. F. SHAVER, Assistant Examiner

U.S. Cl. X.R.

260—824, 827